United States Patent [19]

Choi

[11] Patent Number: 5,787,066
[45] Date of Patent: Jul. 28, 1998

[54] BOTH-SIDED OPTICAL DISC PLAYER CAPABLE OF TRANSFERRING A BOTH-SIDED DISC UP AND DOWN ABOUT AN OPTICAL PICKUP

[75] Inventor: Yang-Oh Choi, Seoul, Rep. of Korea

[73] Assignee: Daewoo Electronics Co., Ltd., Seoul, Rep. of Korea

[21] Appl. No.: 580,614

[22] Filed: Dec. 29, 1995

[30] Foreign Application Priority Data

Dec. 29, 1994 [KR] Rep. of Korea ............ 94-38649

[51] Int. Cl.⁶ .................................................. G11B 17/04
[52] U.S. Cl. ..................... 369/200; 369/199; 369/195; 369/75.2
[58] Field of Search .......................... 369/75.2, 77.1, 369/77.2, 181, 195, 199, 200

[56] References Cited

U.S. PATENT DOCUMENTS 3,108,812  10/1963  Rabinow .................. 369/199
5,365,506  11/1994  Lee ............................ 369/75.2

FOREIGN PATENT DOCUMENTS 56-22250   3/1981  Japan ........................ 369/199
63-113968  5/1988  Japan ........................ 369/200

*Primary Examiner*—Stuart S. Levy
*Assistant Examiner*—William R. Korzuch
*Attorney, Agent, or Firm*—Beveridge, DeGrandi, Weilacher & Young, LLP

[57] ABSTRACT

A both-sided optical disc player for recording/reproducing information on a both-sided disc includes a disc deck having a turntable being shaft-supported by a spindle motor to be rotated for driving the disc and an optical pickup slidably connected on the upper portion of the disc deck. A disc tray guides the disc to the turntable for loading the disc onto the disc deck. A clamp apparatus pressively supports the both-sided disc on the turntable. The both-sided disc seated on the turntable is transferred up and down centering about the optical pickup by a transfer apparatus to reproduce respective sides of the both-sided disc. Thus, trembling of the optical pickup is significantly reduced to realize stable recording/playback operations.

4 Claims, 10 Drawing Sheets

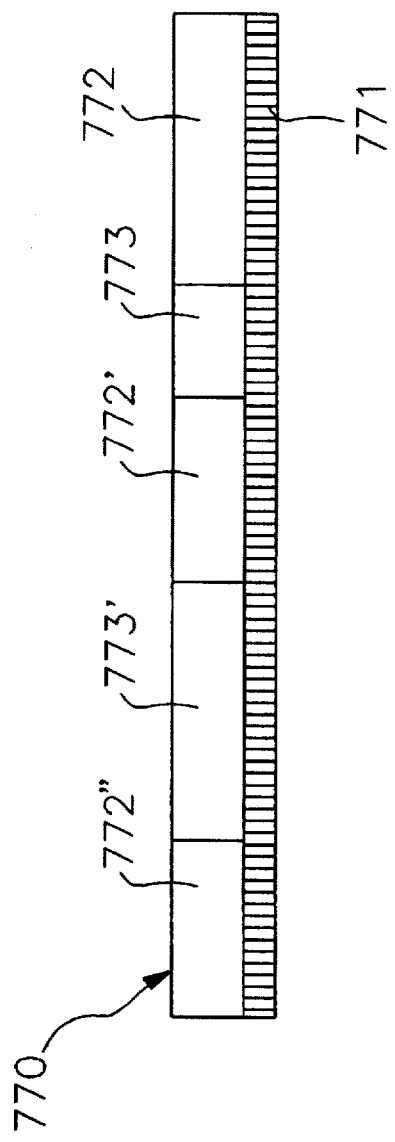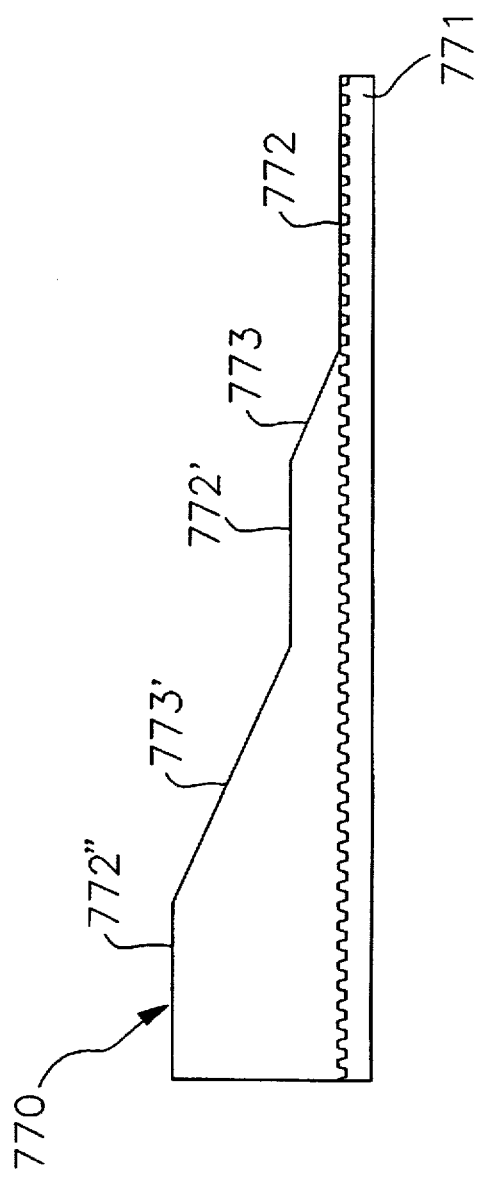

BOTH-SIDED OPTICAL DISC PLAYER CAPABLE OF TRANSFERRING A BOTH-SIDED DISC UP AND DOWN ABOUT AN OPTICAL PICKUP

BACKGROUND OF THE INVENTION

1. Field of the Invention

The present invention relates to a both-sided optical disc player, and more particularly to a both-sided optical disc player capable of executing a stable playback of a both-sided optical disc having an information recording layer on both sides thereof by easily moving the both-sided disc to the up and down aide of an optical pickup apparatus during recording/reproducing the both-sided disc.

2. Description of the Prior Art

Recently, optical discs such as a compact disc (CD) and a laser disc are commercially available on the market as optical recording media having the pattern of optical cards and discs.

The optical data media should have a high data density for attaining the minimization of the CD or enabling the recording of a high definition television compatible with the video disc.

For contriving the high data density in the optical data media, a readout laser executes a focusing with the finer beam diameter. However, the practically available maximum value of a numerical aperture (NA) of an objective lens which focuses the laser is approximately 0.6. The similar result can be obtained when shortening the wavelength of the laser, but the wavelength of the actual semiconductor laser has a concern of limitation. As a second measure, a V groove is utilized within the optical disc to attain the high density, which is disclosed in U.S. Pat. No. 4,569,038 issued to Nagashima et al. in the date of Feb. 4, 1986.

A capacity of data recordable on an optical disc by using the conventional technique is written as follows. In case of the optical disc retained within a 3.5-inch cassette case, the disc diameter is approximately 86 mm, and a data storage area is 25 mm to 41 mm. Assuming that the laser with the wavelength of 670 nm is applied to the objective lens of which NA is 0.55, the capacity of one unformatted side having 0.8 μm (V-groove pitch is 1.6 μm) track pitch and 0.47 μm bit length is 1.1 Gbytes. If a standard CD format is utilized, one formatted side has approximately 550 Mb capacity identical to that of 12 cm CD.

If information afforded in the printed matter is provided on the CD-ROM or other optical data media in the future, it would be essential and convenient to record the information on the information recording medius as can do in the current data media instead of solely reading the information. A method enabling this goal is for partitioning the disc into read/writable areas, in which a recording layer is formed to the internal area of the disc, and the read-only data area is formed to a metal reflective layer of an external area of the disc. However, this method decreases the read-only data area, which in turn brings about a result of confining the amount of information distributable on a single disc.

As stated in the above description, the optical media such as the optical disc and optical card is required to have a high capacity as well as to have a smaller size. In order to improve the information density per unit area of the optical media such as the optical disc, a both-sided optical disc having the recording layer on both sides thereof and a multi-layered optical disc having plural data recording layers have been developed. At the same time, proposals for developing optical pickup apparatuses which record/reproduce the both-sided optical disc or multi-layered optical disc has been conducted.

One example of the general optical pickup apparatus for recording/reproducing information on such an optical disc is disclosed in U.S. Pat. No. 4,797,866.

Hereinafter, a conventional optical pickup apparatus for recording/reproducing an optical disc will be described with reference to FIG. 1.

FIG. 1 is a schematical view showing the conventional optical pickup apparatus for recording on/reproducing from the optical disc. A light source is a laser diode 10 for generating laser beam to record/reproduce the information on/from an optical disc D. The laser beam emitted from laser diode 10 is converted into parallel rays by a collimator lons 11. The beams converted into the parallel rays by means of collimator lens 11 sequentially pass through a beam splitter 12 and an objective lens 14 to be incident to a surface of optical disc D while forming a beam spot of about 1 μm.

Here, beam splitter 12 is installed such that slanted planes (45°) of two right-angled triangle prisms face to each other, and a coating layer 13 is formed on the slanted planes. Thus, the straight advancement of the incident beam is ensured while some of the incident beam is transmitted and the other beam is reflected in the angle of 90° with respect to the incident light.

The laser beam focusing on a recording surface R of optical disc D after straightly transmitting through beam splitter 12 is reflected from disc D to be incident to beam splitter 12 via objective lens 14 again. The laser beam is reflected by berm splitter 12 at right angle, and converges while passing through a focusing lens 15 installed to the optical path of the reflected light. Then, only the upper half of the reflected beam focusing by focusing lens 15 proceeds as shown by knife edge 16 to be accepted by a light-receiving diode 17. Here, light-receiving diode 17 is a light-receiving diode divided by two, four or six, so that a positional accuracy of the optical pickup apparatus with respect to the disc, i.e., a focusing error and a tracking error, is detected from the image of the received beam. By this operation, the focusing and tracking is controllable. Also, the Information is reproduced based on the quantity of the reflected light determined by pits P of optical disc D.

However, for recording/reproducing on/from the both-sided optical disc by using the optical pickup apparatus, either one side of the optical disc is reproduced and the disc is then turned upside down for reproducing the other side; otherwise, the optical pickup apparatus is transferred to the up and down sides of the disc. In other words, it is required to adopt either one of an apparatus for transferring the disc to the up and down sides of the optical pickup centering about the optical pickup or an apparatus for transferring the optical pickup centering about the disc to the up and down sides of the disc.

For example, U.S. Pat. No. 4,839,881 issued to Takahara et al. dated in Jun. 13, 1989 describes a both-sided optical disc having the recording layer on both sides thereof and an optical disc player having a U-shaped guide assembly which performs the record/playback operations while transferring an optical pickup apparatus along the upper and lower surfaces of the both-sided optical disc by means of U-shaped guide rails during the record/playback operations of the both-sided optical disc.

However, the both-sided recording/reproducing optical disc player having the U-shaped guide assembly is apt to be shocked or shaken while the optical pickup apparatus requiring the high precision executes the transfer operation. For this reason, a playback error frequently occurs to significantly degrade the accuracy during the playback operation as well as damage a product.

Furthermore, the both-sided disc recording/reproducing optical disc player having the U-shaped guide assembly is complicated in its structure to impede minimization of the product while raising price of the product.

SUMMARY OF THE INVENTION

Accordingly, it is an object of the present invention to provide a both-sided optical disc player for easily moving a both-sided disc having an information recording layer on both sides thereof during the record/playback operations of the both-sided disc to permit a stable playback of the both-sided optical disc.

To achieve the above object of the present invention, there is provided a both-sided optical disc player which includes a main body provided with an insertion groove for insertedly receiving a both-sided disc in a front plane thereof, and a disc deck arranged within the main body having a turntable installed to an upper portion of the disc deck being shaft-supported to be rotated by a spindle motor for driving the disc, and an optical pickup for the use of the both-sided disc slidably connected to the upper portion of the disc deck in the vicinity of the turntable. Also, a disc tray guides the both-sided disc to the turntable for loading the disc upon the disc deck, and a clamp apparatus pressively supports the both-sided disc seated on the turntable of the disc deck by the disc tray upon the turntable. A transfer apparatus transfers the both-sided disc seated on the turntable in the up and down directions centering about the optical pickup.

Here, the clamp apparatus has a planar electromagnet inserted to the spindle motor shaft of a lower portion of the turntable corresponding to a center hole of the both-sided disc for supporting the both-sided disc when the both-sided disc is installed, and a plurality of disc support brackets installed to a lower surface of the electromagnet. In addition, a holder plate having a steel plate at one end thereof is hingedly coupled to the respective support brackets to be rotatable in the perpendicular direction with respect to the disc surface, and a tension spring has both ends connected to corresponding positions of the steel plate of the holder plate and spindle motor shaft. By this connection, the one end of the holder plate is formed of the steel plate to be drawn toward the electromagnet when the attraction force of the electromagnet is applied, and the both ends of the tension spring are connected to corresponding positions of the end and spindle motor shaft to draw the end toward the spindle motor shaft to make the holder plate be parallel with the electromagnet plane, so that the disc is supported from the lower portion thereof by the other end of the holder plate;

The transfer apparatus includes a first driving motor section having a worm in a rotation shaft for moving the disc to a place out of alignment with the optical pickup. A gear assembly of the transfer apparatus has a worm wheel brought into meshing engagement with the worm of the first driving motor section, a spur gear integrally formed to an upper portion of the worm wheel and a support shaft installed to be perpendicular to a disc plane within the main body for rotatably installing the gear centering about the support shaft. A fixing shaft is installed between the disc deck on the main body and gear assembly to be perpendicular to the disc plane. Also, a turntable support bracket has an opening into which said fixing shaft is inserted, so that the turntable support bracket is rotatable centering about the opening and movable up and down along said fixing shaft in a state that the fixing shaft is inserted into the opening. The turntable support bracket has one end formed with a support plate to be provided with the turntable, and also the turntable support bracket has the other end formed with a guide plate which is provided with an arch-shaped gear formed along a side surface of the other end, and the arch-shaped gear being engaged with said spur gear, so that when the spur gear is rotatable by driving of the first driving motor section, the end provided with the arch-shaped gear is rotated about the opening and the end provided with the turntable is also rotated about the opening. Then, a second driving motor section has the pinion in a rotation shaft thereof, and a guide member for transferring the support bracket up and down has a rack brought into moving engagement with the pinion of the second driving motor in one side of the lengthwise direction, and flat guide plates and slanted guide planes repeatedly installed several times. Additionally, a contact plate integrally formed to a lower portion of the turntable support bracket has a shaft supported by the fixing shaft and contacting the flat guide planes and slanted guide planes.

Preferably, the contact plate is formed to be flat at the lower surface in contact with the flat guide place and be slanted at one side contacting the slanted guide plane having the inclination to the slanted guide planes.

Also, the optical pickup for both-sided disc has a single laser beam source, and first and second beam splitters for diverging laser beam from the laser beam source in the up and down directions. First and second objective lenses focus the diverging laser beams onto the optical disc, and first and second photodetectors receive the laser beams returned via first and second beam splitters again after being incident to and reflected from the optical disc to execute a playback operation of information and tracking and focusing operations.

As described above, in the optical disc player according to the present invention, the transfer unit having a special structure is utilized to move the both-sided disc in the up and down direction centering about the optical pickup to reproduce respective sides of the both-sided disc. Thus, the trembling of the optical pickup is significantly decreased over a disc player which typically reproduces the upper and lower sides of the disc by transferring the optical pickup to prevent an error caused by the trembling of and shock upon the optical pickup, thereby realizing the stable record/playback operations, and remarkably enhancing the recording/reproducing accuracy of the both-sided optical disc player.

Furthermore, the optical disc player according to the present invention is simplified in the structure thereof as compared with the disc player which typically reproduces the upper and lower surfaces of the disc by transferring the optical pickup to serve for minimizing the product while economizing cost.

BRIEF DESCRIPTION OF THE DRAWINGS

The above objects and other advantages of the present invention will become more apparent by describing in detail preferred embodiments thereof with reference to the attached drawings in which:

FIGS. 10A and 10B are a schematic plan view and front view showing the guide member of the both-sided optical disc player according to the present invention.

DETAILED DESCRIPTION OF THE PREFERRED EMBODIMENT

Hereinbelow, a both-sided optical disc player according to the present invention will be described in detail with reference to the accompanying drawings.

Figure 1:
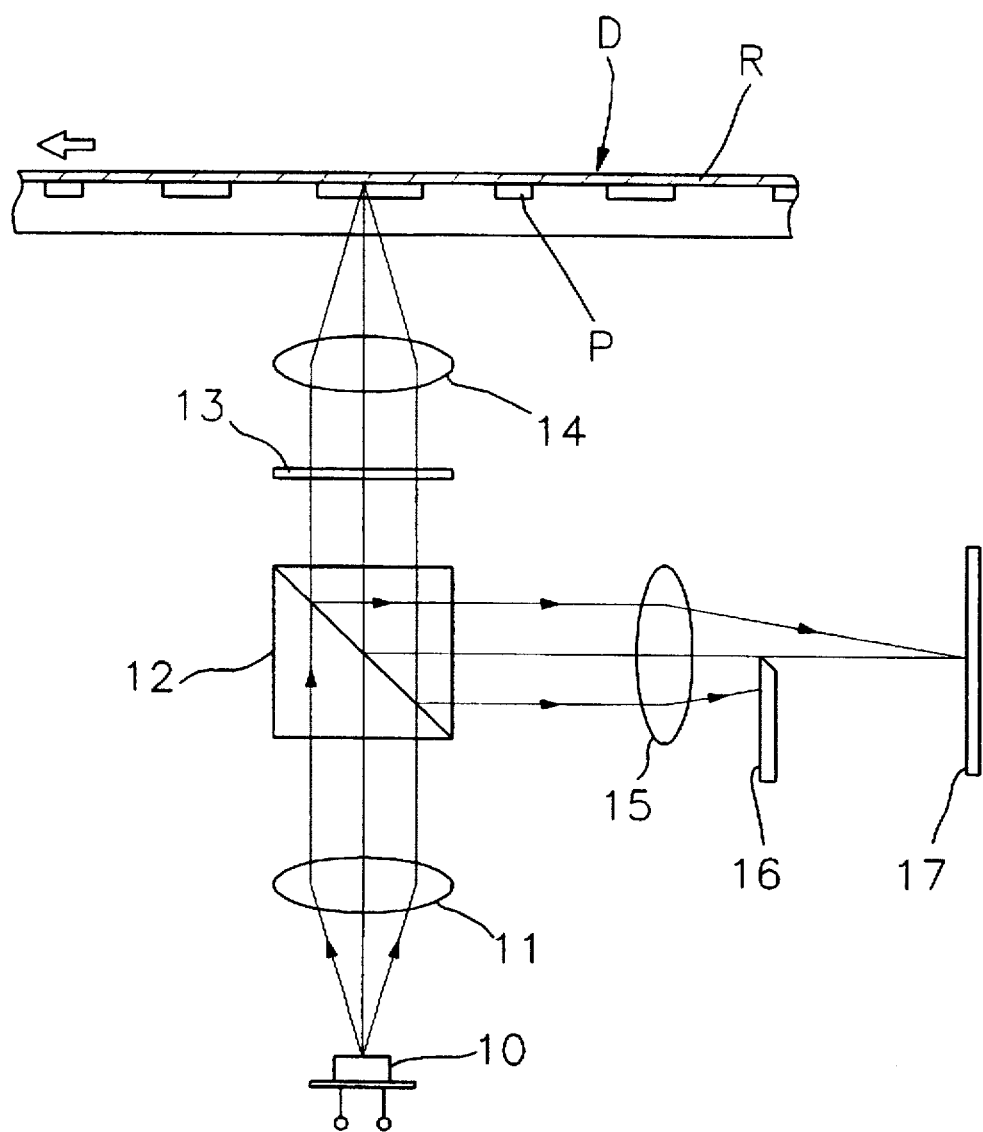
FIG. 1 is a schematic section view showing a conventional optical pickup apparatus for recording/reproducing an optical disc.
Figure 2:
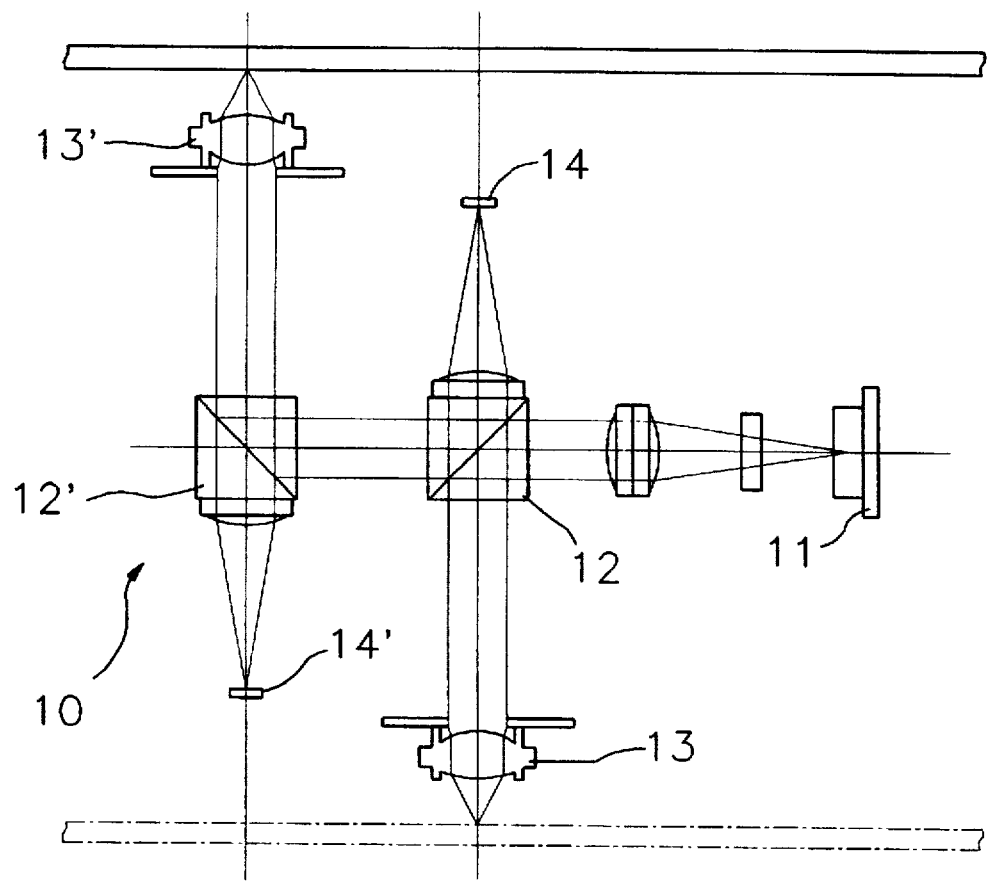
FIG. 2 is a schematic section view showing one embodiment of and optical pickup apparatus for recording/reproducing a both-sided optical disc according to the present invention.
Figure 3A:
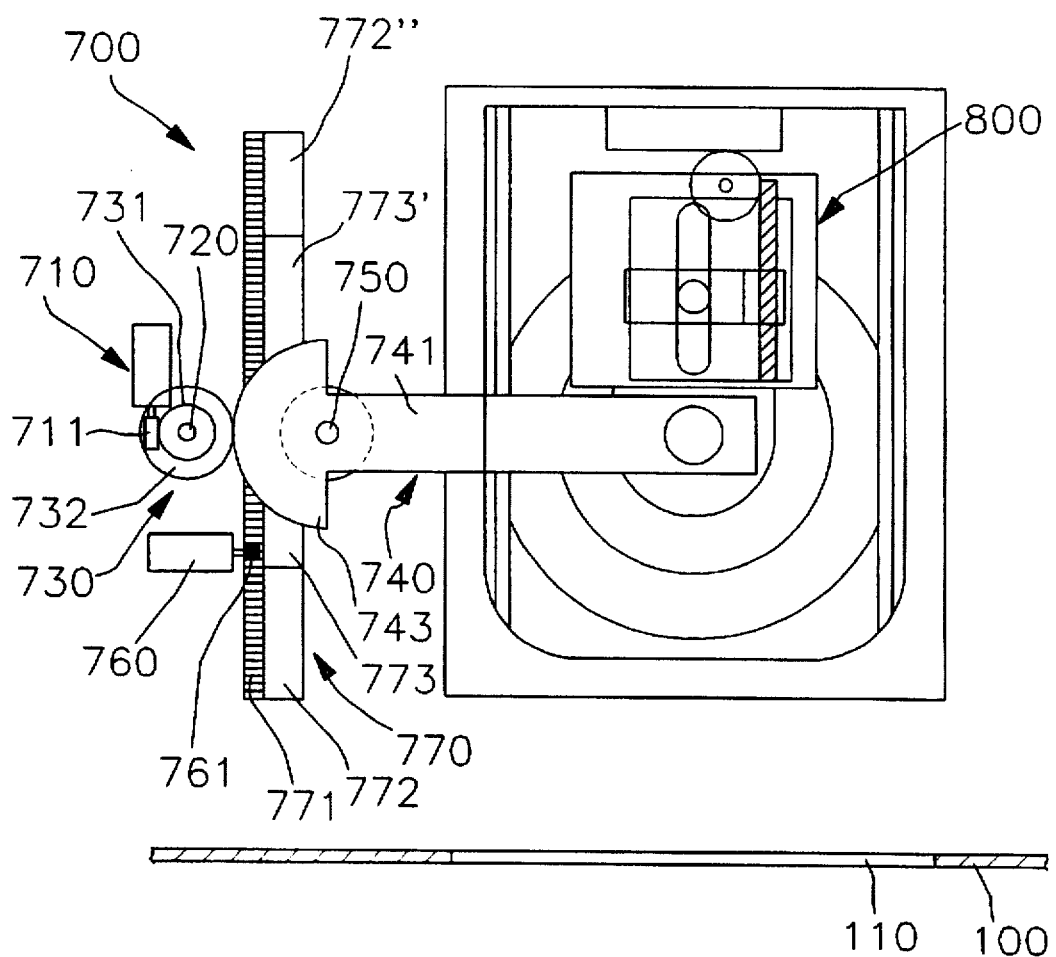
FIGS. 3A and 3B are a schematic plan view and front view showing the both-sided optical disc player according to the present invention.
Figure 3B:
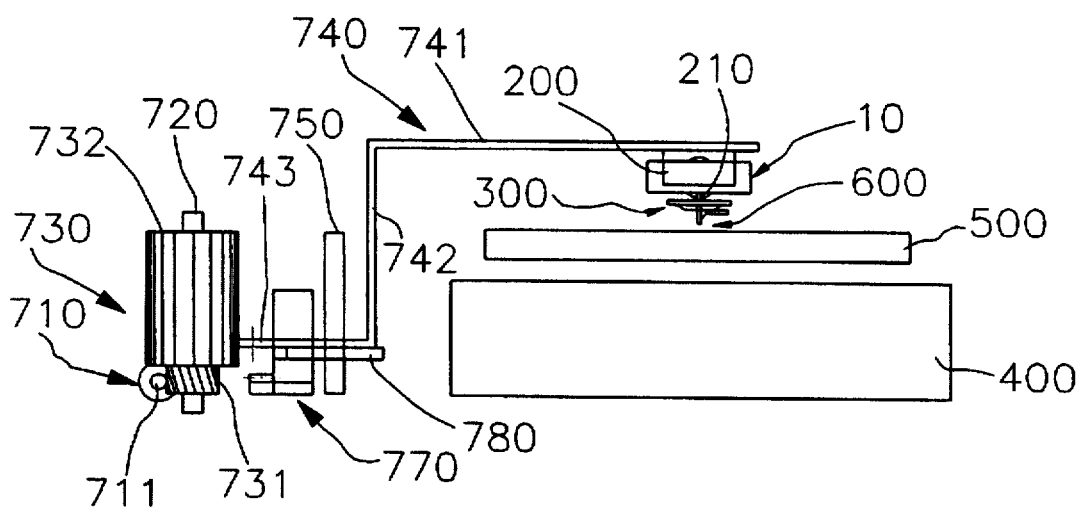

FIG. 2 is a schematic section view showing one embodiment of an optical pickup apparatus for recording/reproducing a both-sided optical disc employed to the both-sided optical disc player according to the present invention. FIGS. 3A and 3B are a schematic plan view and front view showing the both-sided optical disc player according to the present invention.

As illustrated in FIGS. 3A and 3B, a main body 100 of the optical disc player is provided with an insertion groove 110 in the front plane thereof for insertedly receiving a both-sided disc D.

A spindle motor 200 and a turntable 300 supported to be rotatable about a shaft 210 of spindle motor 200 are disposed in the interior of main body 100. An optical pickup 10 for both-sided disc D is slidably arranged to the upper portion of d disc deck 400 in the vicinity of turntable 300.

Here, optical pickup 10 for both-sided disc, as shown in FIG. 2, includes a single semiconductor laser diode 11, and first and second beam splitters 12 and 12' which diverge laser bean from laser diode 11 in the up and down directions. The diverging laser beams respectively focus on optical disc D via first and second objective lenses 13 and 13'. Thereafter, the laser beam incident to be reflected from optical disc D returns by way of first and second beam splitters 12 and 12'. Then, first and second photodetectors 14 and 14' receive the laser beam to execute the playback operation of information and tracking and focusing operations.

Meanwhile, a disc tray 500 for seating disc D thereon via insertion groove 110 of main body 100 is exposed by a predetermined length. Disc tray 500 guides disc D seated on a turntable 300 of disc deck 400 by a guide apparatus (not shown).

Figure 4B:
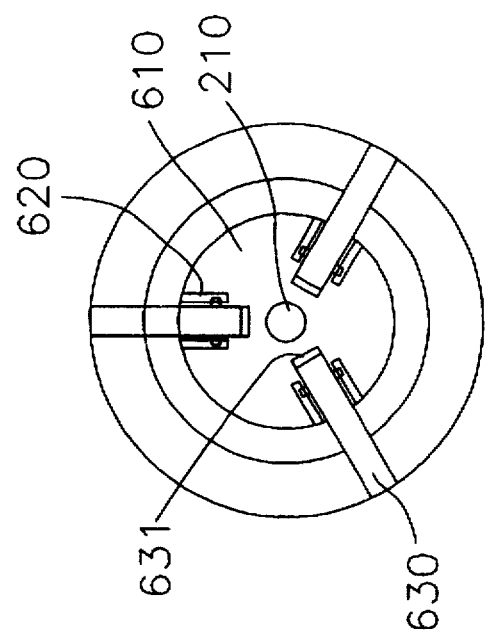
FIGS. 4A and 4B are a schematic plan view and front view showing the clamp apparatus of the both-sided optical disc player according to the present invention.
Figure 4A:
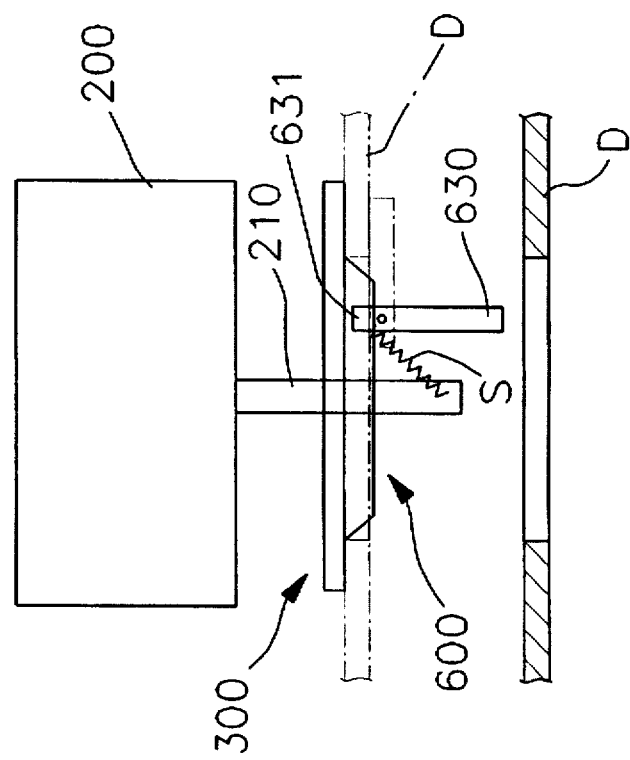

Both-sided disc D guided on turntable 300 of disc deck 400 by disc tray 500 is pressively supported onto turntable 300 by means of clamp apparatus 600 illustrated in FIGS. 4A and 4B.

FIGS. 4A and 4B are a schematic plan view and front view showing the clamp apparatus of the both-sided optical disc player according to the present invention.

Clamp apparatus 600, as shown in FIGS. 4A and 4B, is constructed such that a planar electromagnet 610 is fitted to spindle-motor shaft 210 on the lower portion of turntable 300 to support the bottom side of disc D when both-sided disc D is installed.

A disc support bracket 620 of, e.g., three pairs, is installed to the lower portion of turntable 300 about spindle-motor shaft 210. A holder plate 630 is hingedly coupled to respective disc support brackets 620 to be rotatable in the perpendicular direction with respect to the surface of disc D. One end of holder plate 630 is formed of a steel plate, so that the steel plate is drawn toward electro-magnet 610 when electro-magnet 610 exerts the attraction force to make holder plate 630 perpendicular to the electromagnet plane.

Both ends of a tension spring S are connected to the opposite positions of the steel plate of holder plate 630 and spindle-motor shaft 210. By this connection, when the attraction force of electromagnet 610 is not exerted, the end formed with the steel plate is drawn toward spindle-motor shaft 210 to force holder plate 630 to be parallel with the electromagnet plane. Consequently, disc D can be supported from the lower portion by the other end of holder plate 630.

Both-sided optical disc D pressively supported onto turntable 300 by clamp apparatus 600 is transferred in the up and down directions centering about optical pickup 10 by means of a transfer apparatus 700.

Transfer apparatus 700 for transferring both-sided optical disc D to the up and down directions centering about optical pickup 10 is provided in such a manner that a first driving motor 710 Is positioned to a predetermined portion adjacent to disc deck 400 within main body 100. A worm 711 is formed to a rotating shaft of first driving motor 710. A gear assembly 730 is installed near to first driving motor 710. Gear assembly 730 includes a worm wheel 731 brought into meshing engagement with worm 711 of first driving motor 710 and a spur gear 732 integrally formed to the upper portion of worm wheel 731. Gear assembly 730 further has a support shaft 720 installed vertically to the surface of disc D within main body 100, and gears 731 and 732 are installed rotatable about support shaft 720.

A reference numeral 740 denotes a turntable support bracket connected to turntable 300 for transferring turntable 300 seated with disc D thereon in the up and down directions. One end of turntable support bracket 740 is formed as a guide plate 742 shaped as a sector and the other is formed as a support plate 741 coupled with turntable 300. Sector-like guide plate 741 has a sector gear 743 along the side of the sector part. Then, gear 743 and spur gear 732 of gear assembly 730 are in the state of the meshing engagement.

Therefore, once first driving motor 710 is operated, guide plate 741 is rotatable clockwise or counter-clockwise since sector gear 743 of guide plate 741 is brought into meshing engagement with spur gear 732 of gear assembly 730.

A fixing shaft 750 projects between disc deck 400 on main body 100 and gear assembly 730 perpendicularly to the surface of disc D. Turntable support bracket 740 is connected by fixing shaft 750 piercing therethrough. By doing so, turntable support bracket 740 is movable up and down with respect to fixing shaft 750, and rotatable centering about fixing shaft 750.

A guide member 770 is formed to the lower portion of turntable support bracket 740.

FIGS. 10A and 10B are a schematic plan view and front view showing the guide member of the both-sided optical disc player according to the present invention.

As illustrated in FIGS. 10A and 10B, guide member 770 serves for transferring turntable support bracket 740 up and down. Guide member 770 is formed with a rack 771 in one side thereof in the lengthwise direction, and flat guide planes 772, 772' and 772" and slanted guide planes 773 used 773' are repeatedly formed thereto. The lengthwise direction of guide member 770 is perpendicularly formed with respect to turntable support bracket 740.

A second driving motor 760 equipped with a pinion 761 is installed adjacent to turntable support bracket 740.

Pinion 761 of second driving motor 760 is installed while being brought into meshing engagement with rack 771 of turntable support bracket 740. By this connection, guide member 770 is moved along the lengthwise direction by rack 771 which is brought into meshing engagement with pinion 761 when second driving motor 760 is operated.

A contact plate 780 is integrally installed to the lower portion of guide plate 742 of turntable support bracket 740. Contact plate 780 contacts flat guide planes 772, 772' and 772" and slanted guide planes 773 and 773' of guide member 770 in its plane while a shaft thereof is supported by fixing shaft 750. Here, contact plane 780 is formed such that the lower surface contacting flat guide planes 772, 772' and 772" has a flat surface and one side contacting slanted guide planes 773 and 773' has the same inclination as that of slanted guide planes 773 and 773'.

Hereinafter, an operation of the both-sided optical disc player according to the present invention will be described with reference to accompanying drawings.

To begin with, FIGS. 2A and 3B which are a schematic plan view and front view showing the both-sided optical disc player according to the present invention illustrate a status of a stop mode. As shown in FIG. 3B, disc tray 500 is transferred by means of the guide apparatus to transfer both-sided optical disc D toward turntable 300.

Under this state, for reproducing an upper recording layer of both-sided optical disc D, disc D should be loaded onto turntable 300 via clamp apparatus 600.

For this operation, a power is applied to electromagnet 610 installed below turntable 300, and then steel plate 631 installed to the lower end of holder plate 630 rotatably installed to disc support bracket 620 underlying turntable 300 is drawn toward electromagnet 610. Consequently, as shown in FIG. 4, holder plate 630 is rotated to be perpendicular to the plane of electromagnet 610. That is, holder plate 630 becomes perpendicular to turntable 300.

Figure 5A:
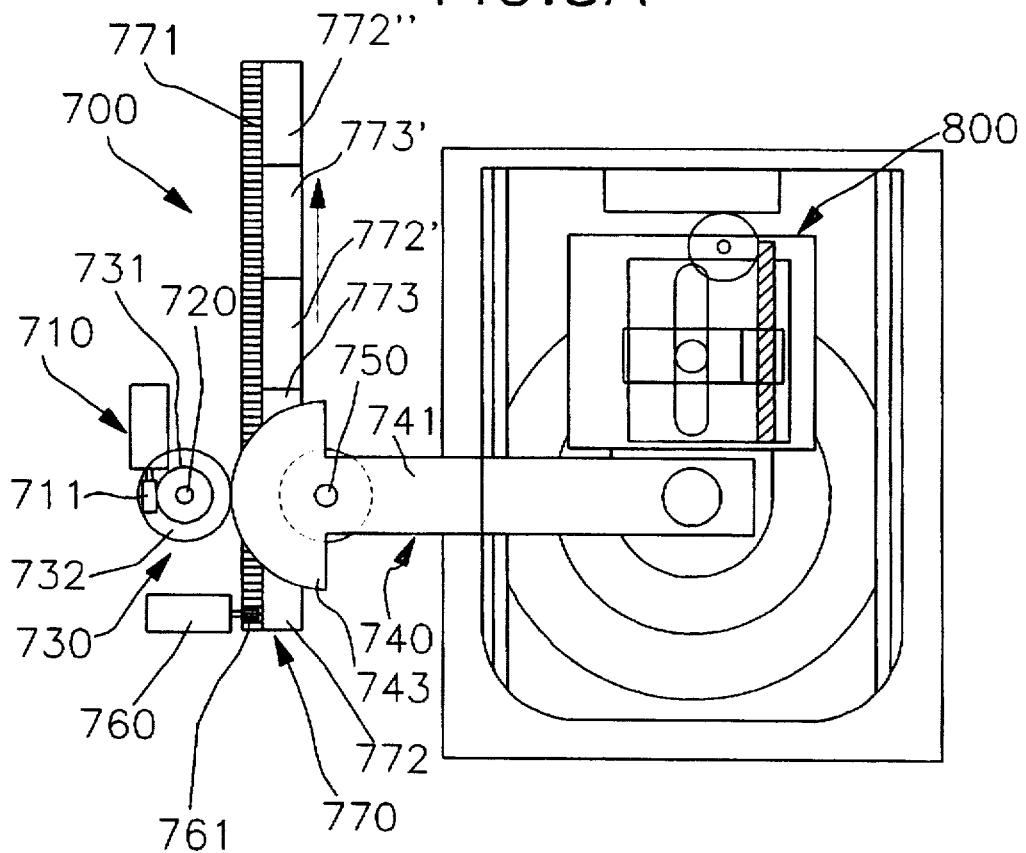
FIGS. 5A and 5B are a schematic plan view and front view showing a state of checking the optical disc transferred by the disc tray in the both-sided optical disc player according to the present invention.
Figure 5B:
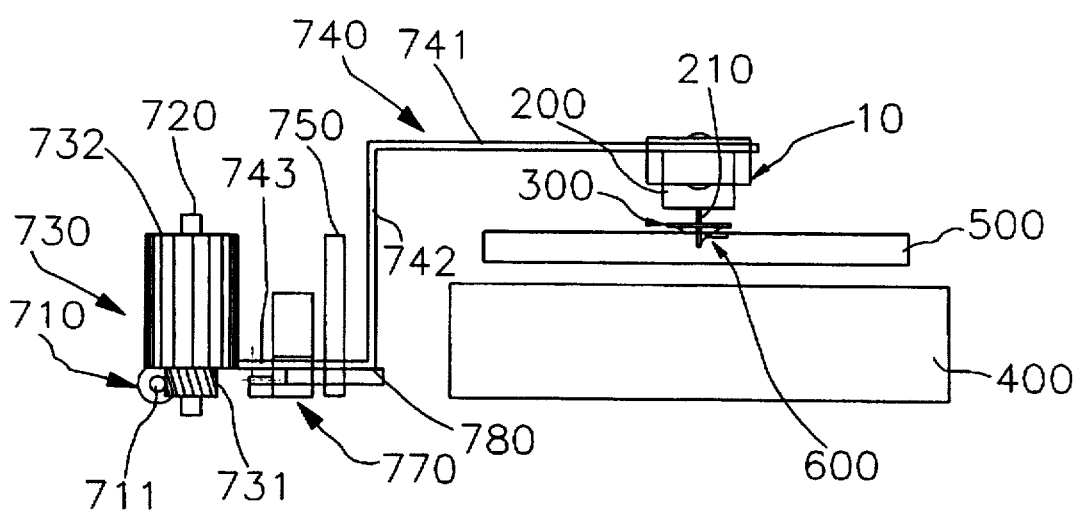

Under the above-described state, once second driving motor 760 is driven to rotate pinion 761, as shown in FIGS. 5A and 5B, rack 771 brought into meshing engagement with pinion 761 is driven. Thus, guide member 770 having rack 771 in one side thereof is lengthwisely transferred backward, i.e., in the direction reverse to the front plane formed with insertion groove 110 of main body 100. At this time, contact plate 780 in contact with one side of guide member 770 is transferred downward along fixing shaft 750, and simultaneously transferred downward along the flat guide planes and slanted guide planes of guide member 770. By doing so, contact plate 780 is placed on plain guide plane 772 formed to the foremost front of guide member 770 with the consequence of projectingly inserting holder plate 630 installed to the lower surface of turntable 300 from a hole of both-sided optical disc D.

If the power having been applied to electromagnet 610 is cut off under the foregoing state, the magnetic force of electromagnet 610 disappears. At the same time, one end of holder plate 630 connected to tension spring s is drawn toward spindle motor shaft 210 as indicated by the dotted line of FIG. 4 by means of the tensile force of tension spring S formed to one end thereof to allow holder plate 630 to parallel with the plane of electromagnet 610. Therefore, disc D is supported from the lower portion by the other end of holder plate 630, and optical disc D is stably fixed onto turntable 300 as shown in FIG. 5B.

Figure 6A:
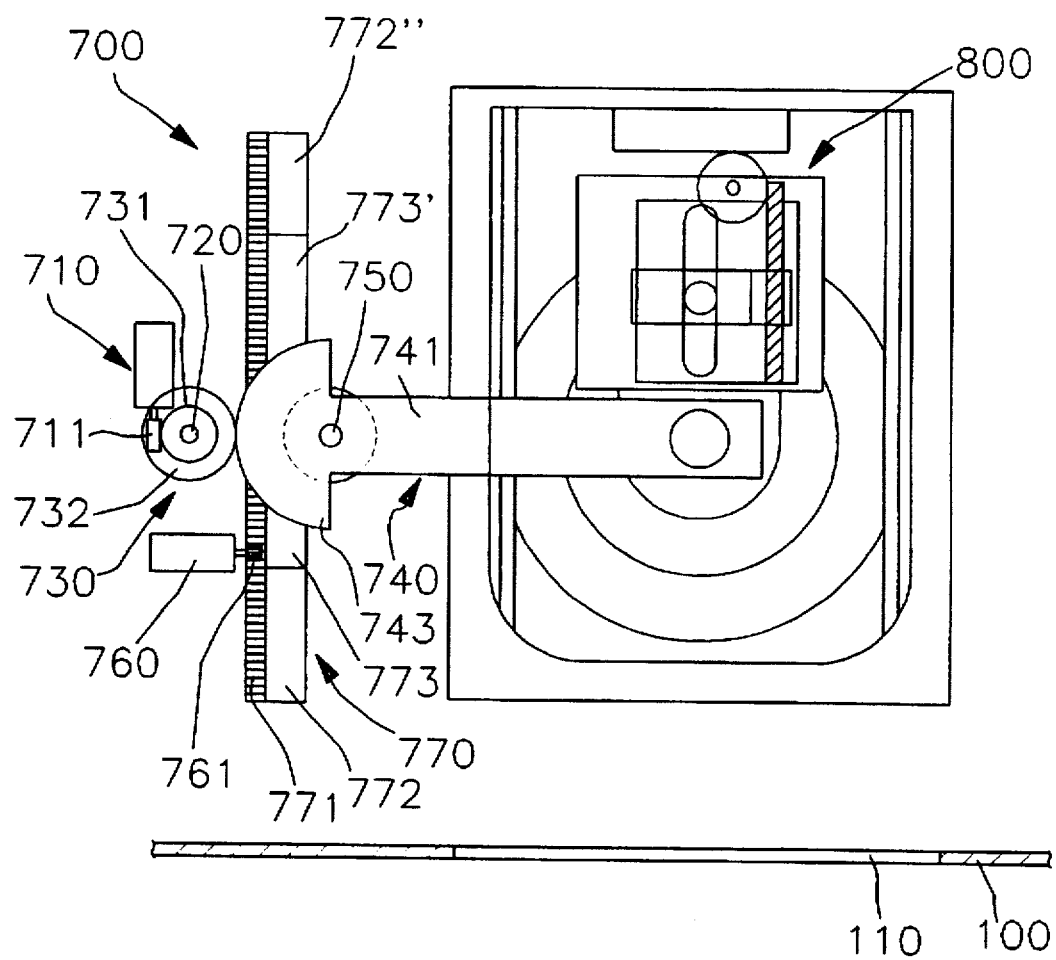
FIGS. 6A and 6B are a schematic plan view and front view when one side of the both-sided disc is reproduced in the both-sided optical disc player according to the present invention.
Figure 6B:
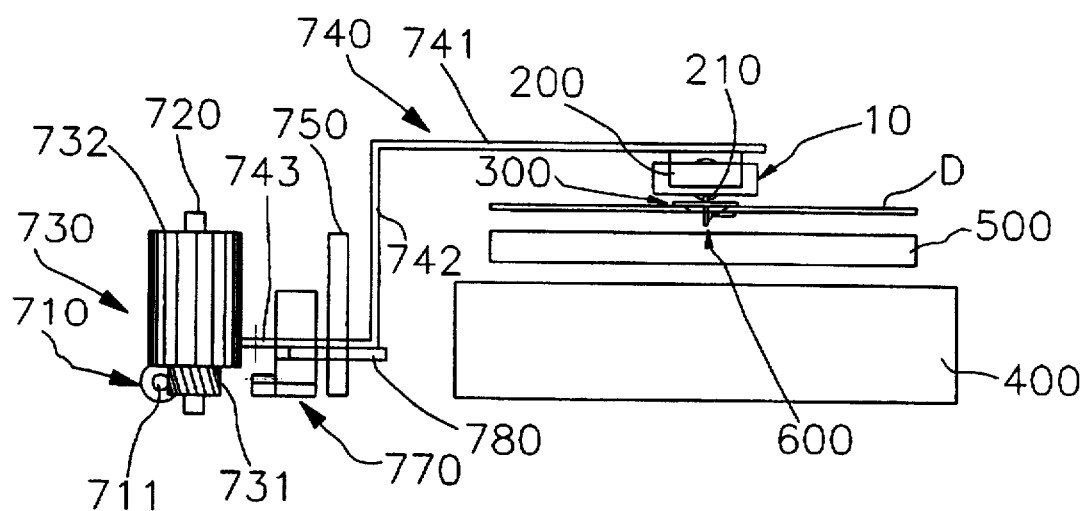

Under this state, for recording/reproducing both-sided optical disc D, second driving motor 760 is driven to move guide member 770 toward the front of main body 100 as shown in FIGS. 6A and 6B. Then, guide member 770 is moved toward the front of main body 100 until contact plate 780 reaches flat guide plane 772' in the center of guide member 770. At this time, contact plate 700 and turntable support bracket 740 integrally formed with contact plate 780 to the bottom side thereof are transferred upward centering about fixing shaft 750. Therefore, as shown in FIGS. 6A and 6B, turntable 300 seated with both-sided optical disc D thereon is placed on the lower portion of optical pickup 10.

Here, optical pickup transfer unit 800 is utilized to transfer optical pickup 10 in the radius direction of both-sided optical disc D to record/reproduce the upper recording layer of both-aided optical disc D.

Here, optical pickup 10 for both-sided disc, as shown in RIG. 2, includes single laser diode 11 and first and second beam splitters 12 and 12' for diverging the laser beam emitted from laser diode 11 upward and downward. The diverged laser beams respectively focus on optical disc D via first and second objective lenses 13 and 13', and the laser beams incident/reflected to/from optical disc D return by passing through first and second beam splitters 12 and 12' again. Then, photodetectors 14 and 14' receive the laser beams to perform the playback operation of the information and tracking and focusing operations.

On the other hand, in order to record/reproduce the lower recording layer after recording/reproducing the upper recording layer of both-sided optical disc D, it is required that turntable 300 is transferred to the upper portion centering about optical pickup 10 to execute the record/playback operations.

Figure 7A:
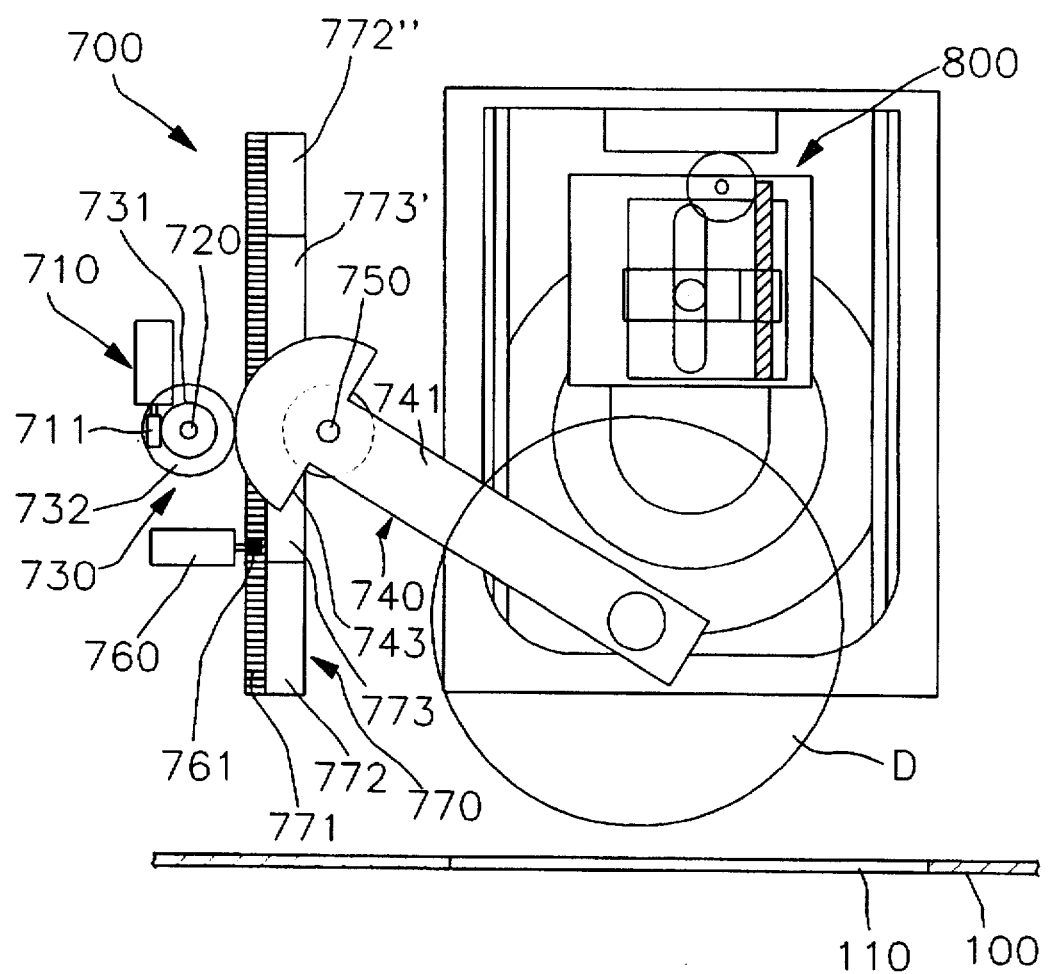
FIGS. 7A and 7B are a schematic plan view and front view when the turntable is transferred upward centering about the optical pickup in the both-sided optical disc player according to the present invention.
Figure 7B:
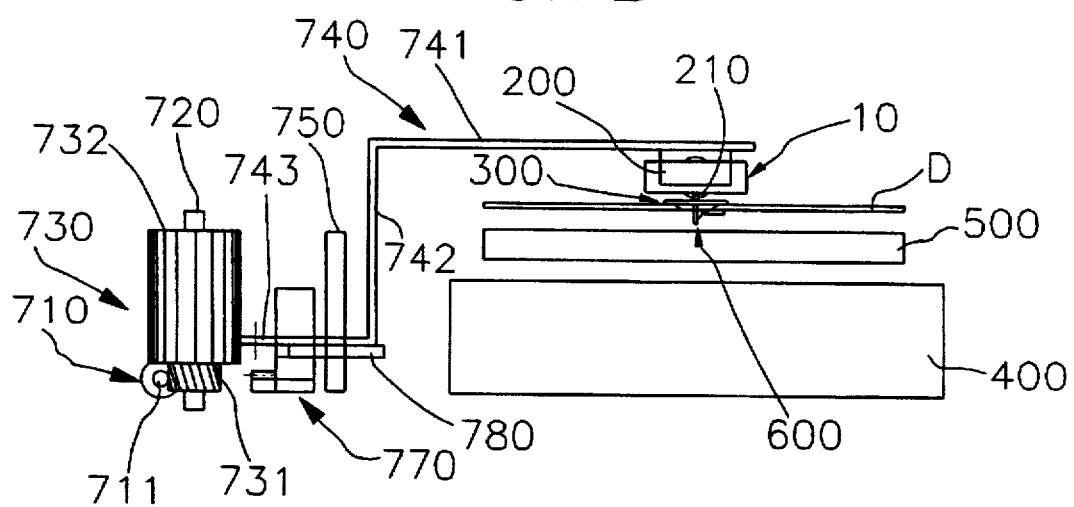

While both-sided optical disc D is placed on the upper portion of optical pickup 10 for recording/reproducing the upper recording layer of both-sided optical disc D, as shown in FIGS. 7A and 7B, first driving motor 710 is primarily driven to rotate worm 711 formed to the rotating shaft thereof.

By this rotation, worm wheel 731 of gear assembly 730 brought into meshing engagement of worm 711 is rotated to thus rotatably drive spur gear 732 integrally formed to the upper portion of worm wheel 731, Therefore, sector gear 743 of turntable support bracket 740 brought into meshing engagement with spur gear 732 is driven to be rotated. Consequently, support plate 741 of turntable support bracket 740 is rotated clockwise by a predetermined angle center about fixing shaft 750, thereby, as shown in FIG. 7A, being free from optical pickup 10 and optical pickup transferring apparatus 800 for transferring optical pickup 10 when turntable 300 supporting both-sided optical disc D is moved up and down. That is, turntable support bracket 300 supporting turntable 300 is movable up and down centering about fixing shaft 750 without involving any obstruction.

Figure 8A:
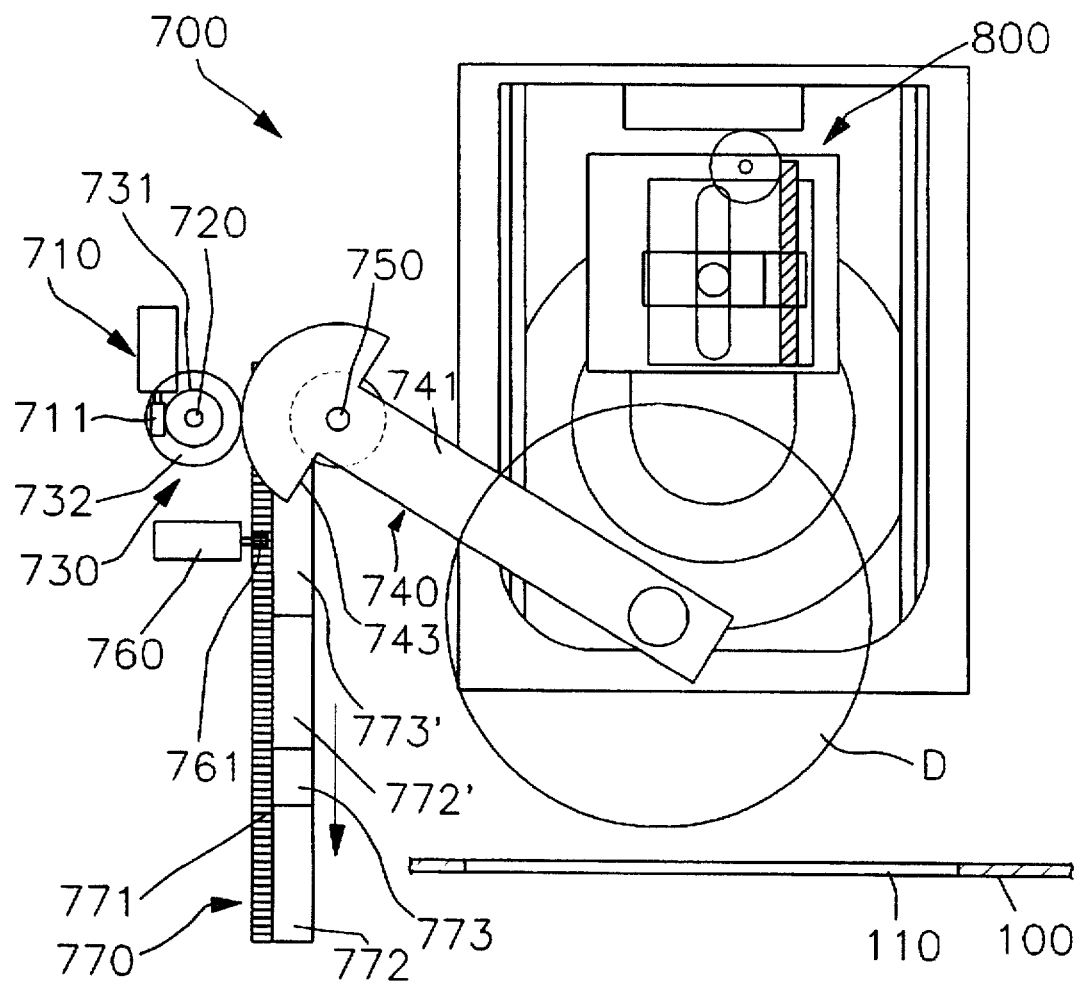
FIGS. 8A and 8B are a schematic plan view and front view when the turntable is transferred downward centering about the optical pickup in the both-sided optical disc player according to the present invention.
Figure 8B:
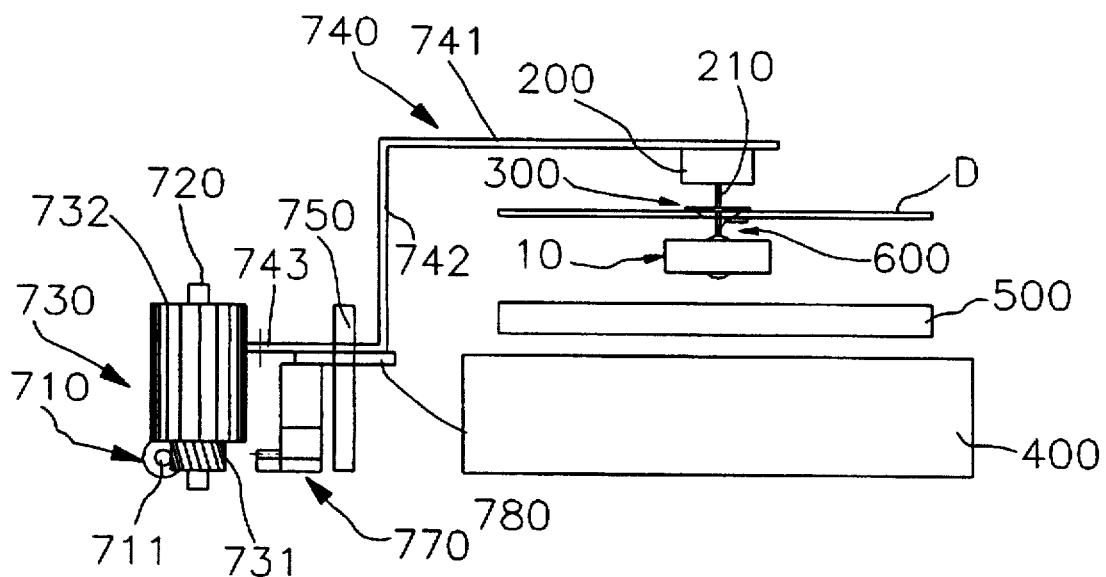

While turntable 300 is free from optical pickup 10 like the above manner, second driving motor 760 is driven to rotate pinion 761 formed to the rotation shaft thereof, as shown in FIGS. 8A and 8B, for moving both-sided optical disc D to the upper portion of optical pickup 10. Then, rack 771 brought into meshing engagement of pinion 761 is driven. Accordingly, guide member 770 having rack 771 in one side thereof is slidably transferred in the lengthwise direction forward, i.e., in the direction opposite to the front plane formed with insertion groove of main body 100. At this time, contact plate 780 contacting one side of guide member 770 is transferred upward along with fixing shaft 750, and along flat guide planes and slanted guide planes of guide member 770. By doing so, contact plate 780 is placed to flat guide plane 772" formed to the last rear portion of guide member 770. Simultaneously, contact plate 780 and turntable support bracket 740 integrally formed with contact plate 780 are transferred upward centering about fixing shaft 750 with the consequence of placing turntable 300 on the upper portion centering about optical pickup 10.

Figure 9A:
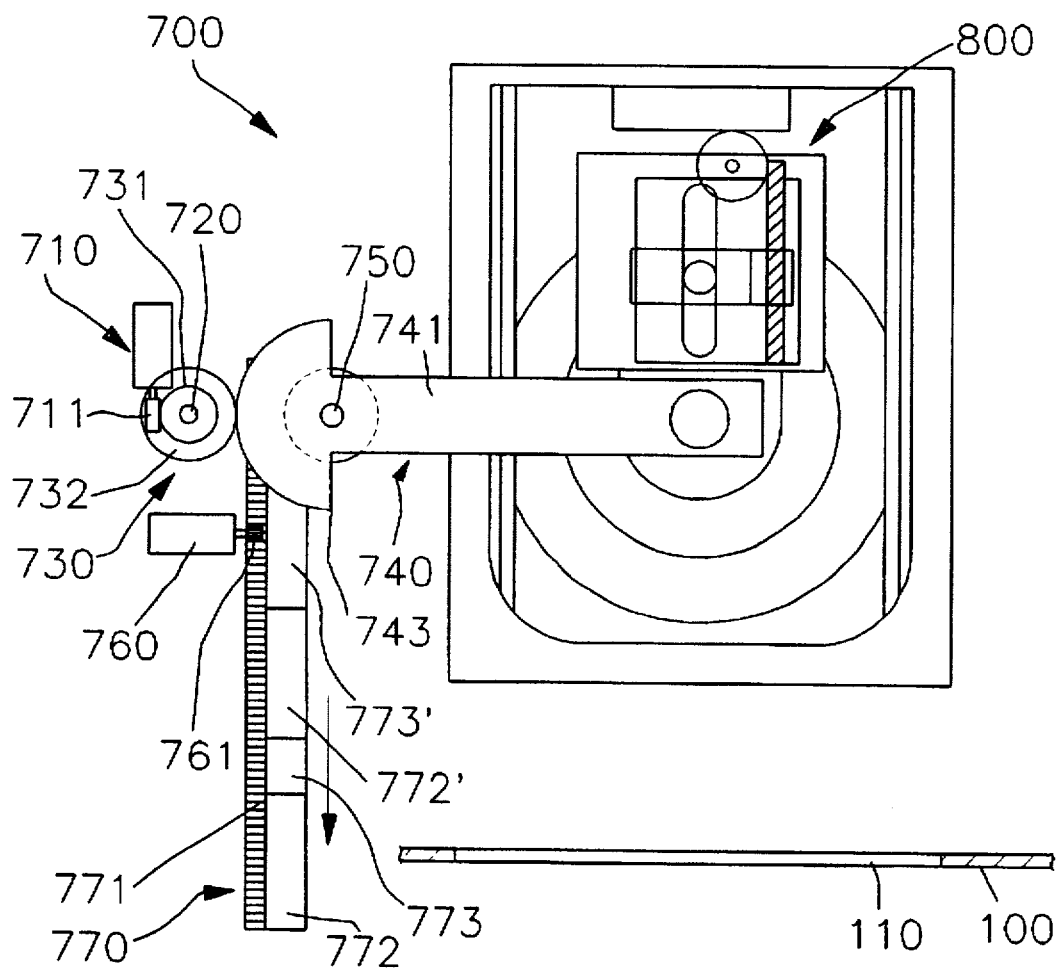
FIGS. 9A and 9B are a schematic plan view and front view when the other side of the both-sided disc is reproduced in the both-sided optical dies player according to the present invention.
Figure 9B:
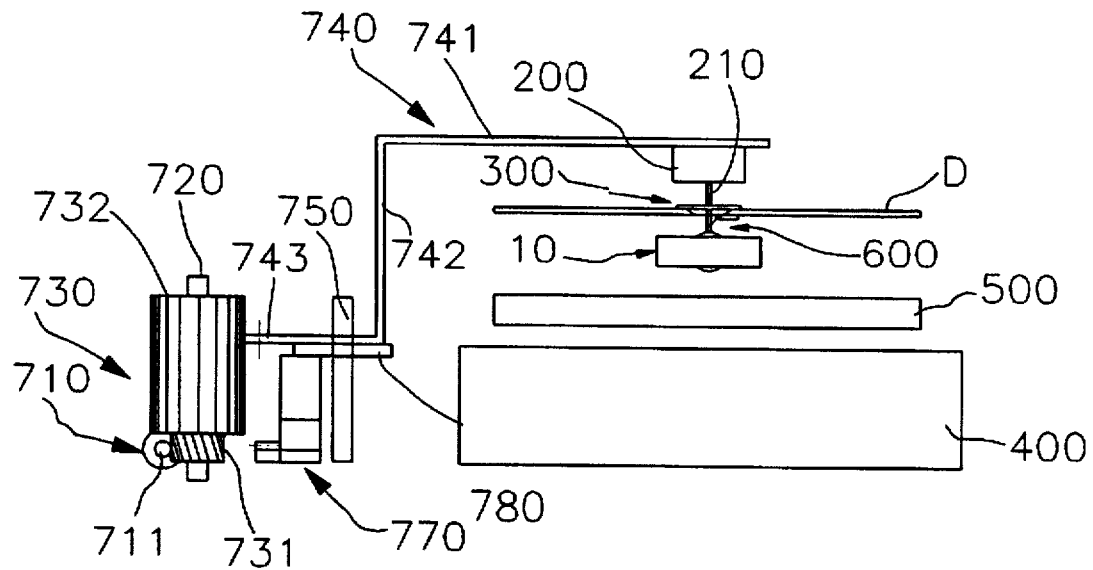

Under this state, an shown in FIGS. 9A and 9B, first driving motor 710 is driven to reversely rotate worm 711 formed to the rotation shaft to align turntable 300 on the immediate upper portion of optical pickup 10.

Therefore, worm wheel 731 of gear assembly 730 brought into meshing engagement with worm 711 is rotated to rotatably drive spur gear 732 integrally formed to the upper portion of worm wheel 731. Successively, sector gear 743 of turntable support bracket 740 brought into meshing engagement with spur gear 732 is driven to be rotated. Consequently, support plate 741 of turntable support bracket 740 is rotated counter clockwise by a predetermined angle centering about fixing shaft 750, thereby, as shown in FIG. 9A, aligning turntable 300 supporting both-sided disc D with optical pickup 10 on the upper portion of optical pickup 10.

At this time, optical pickup transfer unit 800 is utilized to record/reproduce the lower recording layer of both-sided optical disc D while transferring optical pickup 10 in the radius direction of both-sided optical disc D.

In the optical disc player according to the present invention as described above, the transfer unit having the special structure is utilized to transfer the both-sided disc up and down centering about the optical pickup to reproduce both sides of the both-sided disc. As a result, the trembling of the optical pickup is significantly decreased over the conventional disc player which generally transfers the optical pickup to reproduce the upper and lower sides of the disc, so that an error caused due to the trembling and shock of the optical pickup is prevented to realize stable record/playback operations while significantly enhancing the record/playback accuracy of tho both-sided optical disc player.

Furthermore, as compared with the disc player for transferring the optical pickup to reproduce the upper and lower sides of the disc, the structure of the optical disc player according to the present invention is simplified to contribute to the minimization of a product and economization of manufacturing cost.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A both-sided optical disc player comprising:

a main body provided with an insertion groove for insertedly receiving a both-sided disc in a front plane thereof;

a disc deck, said turntable arranged within the main body having a turntable installed to an upper portion of said disc deck being shaft-supported to be rotated by a spindle motor for driving said disc, and an optical pickup for the use of said both-sided disc slidably connected to the upper portion of said disc deck in the vicinity of said turntable;

a disc tray for guiding said both-sided disc to said turntable for loading said disc upon said disc deck;

clamp means for pressively supporting said both-sided disc seated on said turntable of said disc deck by said disc tray upon said turntable; and transfer means for transferring said both-sided disc seated on said turntable in the up and down directions centering about said optical pickup, wherein said transfer means comprises:

a first driving motor section having a worm in a rotational shaft for moving said disc to a place out of alignment with said optical pickup;

a gear assembly having a worm wheel brought into meshing engagement with said worm of said first driving motor section, a spur gear integrally formed to an upper portion of said worm wheel and a support shaft installed to be perpendicular to a disc plane within said main body for rotatable installing said sour gear centering about said support shaft;

a fixing shaft installed between said disc deck on said main body and said gear assembly to be perpendicular to said disc plane;

a turntable support bracket having an opening into which said fixing shaft is inserted, so that said turntable support bracket is rotatable centering about the opening and movable up and down along said fixing shaft in a state that: the fixing shaft is inserted into the opening, the turntable support bracket having one end to be provided with the turntable, and the turntable support bracket having the other end provided with an arch-shaped gear formed along a side surface of the other end, said arch-shaped gear being engaged with said spur gear, so that when the sour gear is rotated by the driving of the first driving motor section, the end provided with the arch-shaped gear is rotated about the opening and the end provided with the turntable is also rotated about the opening;

a second driving motor section having a pinion formed on a rotational shaft thereof;

a guide member for guiding upward and downward transference of said support bracket, said guide member having a rack brought into meshing engagement with said pinion of said second driving motor in one side of the lengthwise direction, and said guide member having flat guide planes and slanted guide planes; and a contact plate integrally formed to a lower portion of said turntable support bracket, said contact plate having a shaft supported by said fixing shaft and contacting with said flat guide planes and said slanted guide planes.

2. The both-sided optical disc player as claimed in claim 1, wherein said clamp means comprises:

a planar electromagnet inserted to the spindle motor shaft of a lower portion of said turntable corresponding to a center hole of said both-sided disc for supporting said both-sided disc when said both-sided disc is installed;

a plurality of disc support brackets installed to a lower surface of said electromagnet;

a holder plate having a steel plate at one end thereof, and being hingedly coupled to said respective support brackets to be rotatable in the perpendicular direction with respect to a disc surface; and a tension spring having both ends connected to corresponding positions of said steel plate of said holder plate and said spindle motor shaft, wherein said one end of said holder plate that is formed of said steel plate is drawn toward said electromagnet when the attraction force of said electromagnet is applied, and said both ends of said tension spring are connected to corresponding positions of said end of said holder plate and spindle motor shaft to draw said end of said holder plate toward said spindle motor shaft to make said holder plate parallel with said disc surface, whereby said disc is supported from the lower portion thereof by the other end of said holder plate.

3. The both-sided optical disc player as claimed in claim 1, wherein said optical pickup comprises;

a single laser beam source;

first and second beam splitters for diverging a laser beam from said laser beam source in the up and down directions;

first and second objective lenses for focusing the diverging laser beams onto said optical disc; and first and second photodetectors for receiving the laser beams returned via said first and second beam splitters after being incident to and reflected from said optical disc, and executing a playback operation of information or tracking and focusing operations.

4. The both-sided optical disc player as claimed in claim 1, wherein said contact plate is formed to be flat at the lower surface in contact with said flat guide planes and be slanted at one side contacting said slanted guide planes having an inclination to said slanted guide planes.

* * * * *